May 27, 1958 W. FLEMER III 2,835,992
PLANT DIGGING MACHINE
Filed March 25, 1955 2 Sheets-Sheet 1

INVENTOR
William Flemer, III

May 27, 1958 W. FLEMER III 2,835,992
PLANT-DIGGING MACHINE
Filed March 25, 1955 2 Sheets-Sheet 2
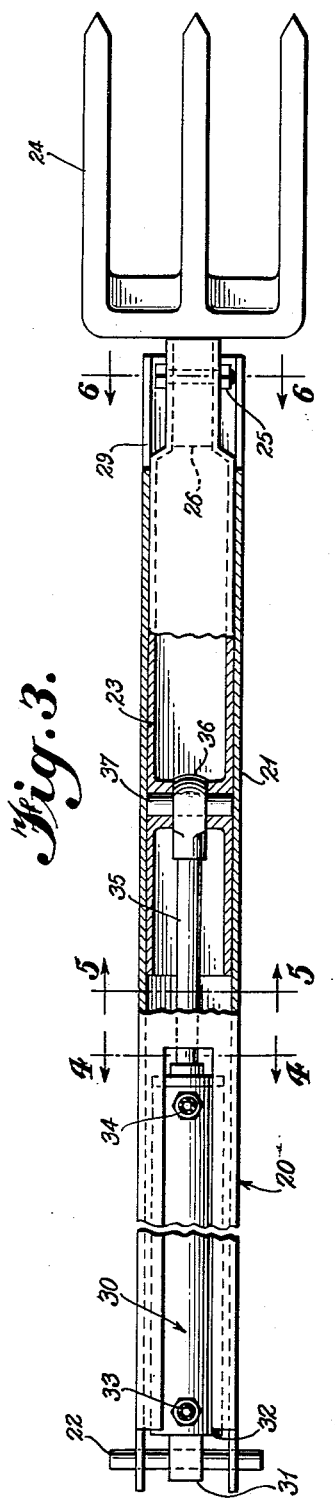
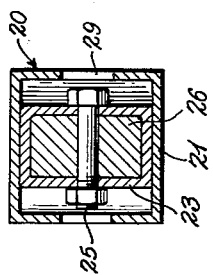
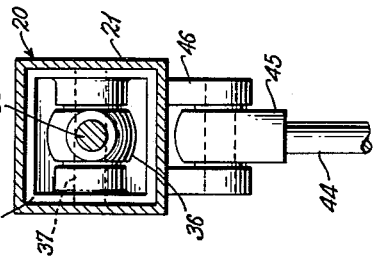
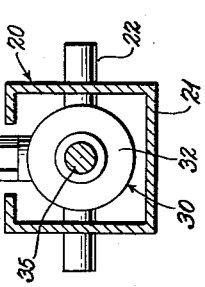
INVENTOR
*William Flemer, III*
BY *Burns, Doane, Benedict & Irons*
ATTORNEYS

United States Patent Office 2,835,992
Patented May 27, 1958

2,835,992

PLANT DIGGING MACHINE

William Flemer III, Princeton, N. J., assignor to Princeton Nurserymen's Research Associates, Princeton, N. J., a partnership Application March 25, 1955, Serial No. 496,675

8 Claims. (Cl. 37—2)

This invention relates generally to an apparatus for digging plants such as trees, shrubs, and the like for transplanting. More specifically, the invention as described hereinafter relates to a machine for removing trees, etc. from the earth with the roots thereof substantially dirt-free so as to facilitate handling and minimize transportation costs in the transplanting of such plants.

In the nursery industry, and particularly in the wholesale large scale operations wherein great numbers of trees, shrubs, etc. are handled for transplanting, in view of the relatively few days wherein the weather and ground conditions are suitable for tree removal, it must be possible to rapidly dig the plants for transplanting. For a period of only one or two months during the spring of the year it is considered practical to remove and ship relatively small trees in the transplanting process. The number of days during this short period during which the trees may be dug is further reduced by unfavorable weather conditions and/or unsuitable ground conditions as where the earth is too dry or too wet for proper removal of the trees to be transplanted.

For many years, it has been the standard nursery practice to dig the nursery trees by first drawing an undercutting plow along the rows of trees to be removed. Such a plow has a generally U-shaped blade which is run beneath the root system of the trees in the row to cut the roots of the trees on the opposite sides of the row and beneath the individual trees which make up the row. After this initial plowing operation, a crew of workmen are used to remove each tree in the row individually. These workmen, equipped with digging spades, surround each tree to be removed and insert their spades into the earth around the base of the tree. After insertion of the spades in a generally circular fashion around the tree base, the workmen pry the tree free from the surrounding earth. In this manual operation, it may require several repeated insertions of the spades into the earth followed by the prying action to effect final removal of the tree from the earth.

In the conventional nursery practice for removing small trees to be transplanted, it will be appreciated that a substantial amount of manual labor is required and also that the tree removal operation is relatively slow. For example, a crew of ten men working on the removal of trees averaging between 12 and 14 feet high can dig around 500 trees in an 8-hour day. In comparison with this, it has been found that a crew of four men working with the tree digging machine of the instant invention can in a similar work-day period remove around 1200, 12 to 14 foot trees for transplanting.

In view of the relatively few suitable working days for tree removal, it will be appreciated that in large-scale nursery operation it is of utmost importance that the maximum number of trees be removed in the shortest period of time. The realization of this need in the nursery industry has given rise to the development of the hereinafter described invention which permits the removal of trees to be transplanted in a minimum amount of time and with a minimum amount of earth left clinging to the roots of the trees as removed. The removal of the trees with the roots dirt-free not only facilitates handling since it removes the necessity for the application of burlap to retain a ball of dirt surrounding the tree roots but also materially reduces the transportation costs since the heavy dirt ball is not present surrounding the tree roots.

It is a principal object of the instant invention to provide a plant digging apparatus which is effective to remove the plants with the roots thereof substantially free of dirt and which effects such removal in a minimum amount of time.

It is also an object of this invention to provide a plant digging machine which may work on a row of plants to be removed for transplanting from the side thereof so as to remove the necessity for wide plant spacing in the original planting and also to permit selective digging of individual trees from a particular row.

It is a further object of this invention to provide a plant digging apparatus which is adaptable by the changing of a digging fork which forms a part of such apparatus to accommodate different types and sizes of trees, shrubs, etc. in digging such plants for transplanting.

It is an additional object of this invention to provide a tree digging machine having an extensible digging fork pivoted about its end to lift the tree out of the ground after such fork has been forced down into the tree root system, thus removing the tree with a minimum quantity of dirt clinging to the tree roots.

The above and additional objects and advantages of the instant invention will be apparent by reference to the description of a preferred embodiment described in detail hereinafter in connection with the accompanying drawings which form a part of this application and in which:

Figure 3 is a plan view partially in section of the extensible tree digging arm;

Figure 4 is a cross-sectional view taken on line 4—4 of Figure 3;

Figure 5 is a cross-sectional view taken on line 5—5 of Figure 3; and

Figure 6 is a cross-sectional view taken on line 6—6 of Figure 3.

Figure 1:
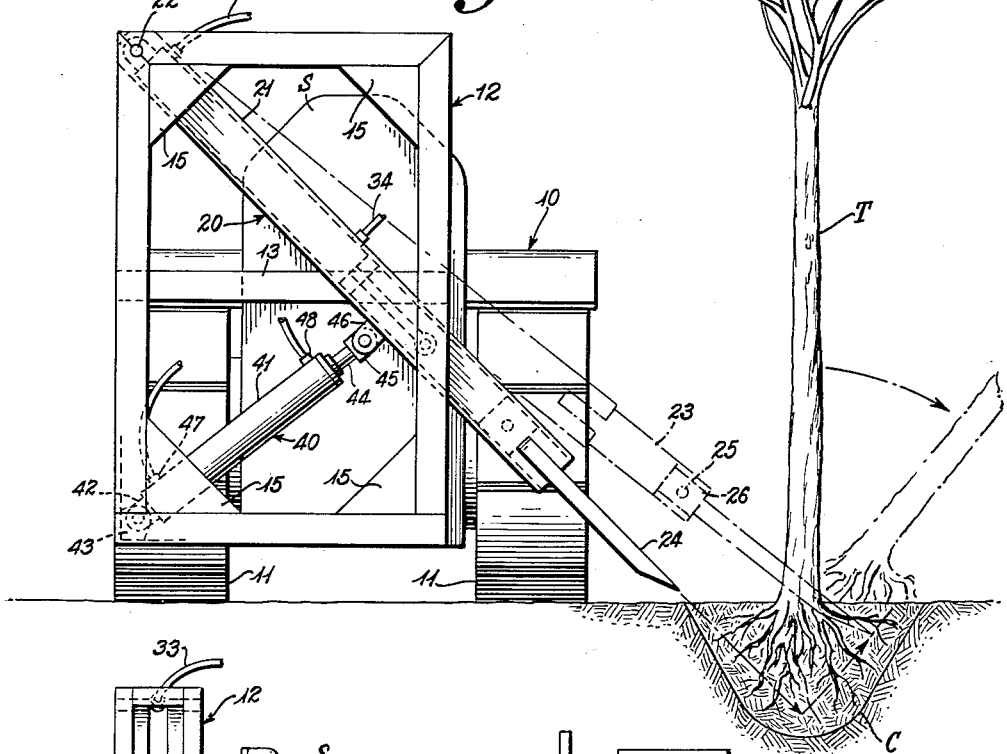
Figure 1 is a rear elevational view showing the plant digging machine of the instant invention in its operative position relative to a tree to be dug.
Figure 2:
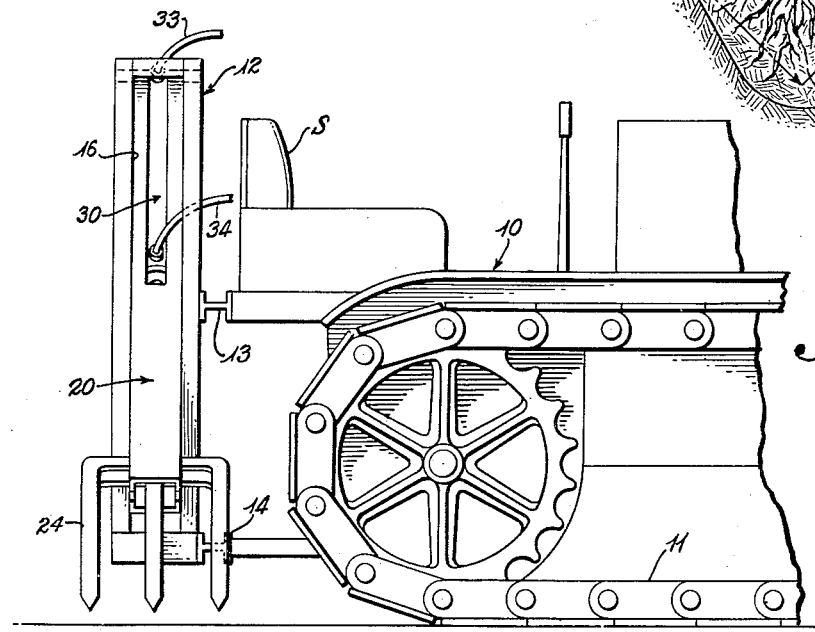
Figure 2 is a partial side elevation of the plant digging machine of Figure 1.

Referring specifically to Figures 1 and 2, there is shown thereon the digging machine of the instant invention with Figure 1 illustrating the manner in which the machine is positioned to effect removal of a plant for transplanting. As illustrated the carrying vehicle which forms a part of the digging machine is a tractor 10 provided with continuous crawler tracks 11 which are driven by the propelling engine of the tractor to effect movement of such tractor. It will of course be recognized that the tractor as illustrated on the drawings is merely exemplary of a suitable carrying vehicle for the digging apparatus. Accordingly, any one of a variety of different types of tractors or other vehicles may be employed for moving the digging apparatus to the various locations for plant removal.

A supporting frame 12 is mounted across the rear of tractor 10 on upper and lower I beams 13 and 14, which beams are secured transversely of the rear of the tractor. The frame 12, as shown more clearly in Figure 1, is generally rectangular being formed by channels joined at their abutting ends and reinforced by triangular gussets 15. The frame is further characterized by having an elongated pocket 16 opening outwardly from one side thereof. As will be apparent from the description given hereinafter, this pocket provides an opening through which the digging arm extends and the vertical sides of this pocket serve to guide movement of such arm during the plant digging operation.

An extensible digging arm 20 is mounted within the frame 12. This arm includes a guide member 21 which is pivotally connected to one corner of frame 12 by means of a pin 22. Cooperating with the guide member 21, there is provided a slide element 23. Slide element 23 has a digging fork 24 removably secured thereto by means of a bolt 25 engaging with the opening in a lug 26 on fork 24.

The details of construction of the extensible digging arm 20 are more clearly shown in Figures 3 through 6 which illustrate such arm removed from the frame 12. From these figures, it will be seen that the slide element 23 is slidably received within the guide member 21. The guide member 21 has a generally square exterior cavity which receives the square slide element 23. By the cooperating square configurations of these two parts, it will be appreciated that relative rotation or twisting of the parts is precluded. It will also be recognized that the parallel side faces of guide member 21 slidably engage with the vertical sides of the pocket 16 of frame 12 to guide the swinging movement of the extensible arm during the digging operation.

The end of guide member 21 opposite pin 22 is provided with a transverse slot 29 which receives the rearward end of the digging fork 24 when slide element 23 is fully retracted into guide member 21.

To elongate the digging arm to project slide element 23 and digging fork 24 carried thereon outwardly of guide member 21, there is provided an elongatable actuator 30. This actuator is housed within the end of guide member 21 adjacent pin 22 and has an anchoring eye 31 which is engaged with pin 22. Eye 31 is secured to the end of the actuator cylinder 32, which cylinder is provided adjacent its opposite ends with couplings 33 and 34 to permit connection of the actuator to a source of hydraulic fluid pressure (not shown). Actuator 30 has a piston rod 35 which is connected by bearing 36 on its outermost end to a journal pin 37 mounted in slide element 23.

It will be understood from the structure described hereinabove that by introducing hydraulic fluid into actuator 30 through coupling 33 while fluid is permitted to exit from coupling 34 the piston rod 35 will drive slide element 23 and digging fork 24 carried thereby outwardly of guide member 21 so as to extend the length of the digging arm 20. Preferably, a spring biased hydraulic control valve (not shown) will be employed in regulating the flow of hydraulic fluid to and from actuator 30. This type of valve has a control lever normally biased to a neutral position and which may be moved to either of two positions to permit flow of fluid to or from a device to be actuated. Such valve is mounted so as to be readily accessible to the driver of the tractor 10 when seated on the tractor seat S. A variety of different valve constructions for effecting regulation of the flow of hydraulic fluid to extensible actuators such as the double acting hydraulic actuator shown are available and it is considered unnecessary to specifically illustrate on the drawings the construction of such a valve.

A second extensible actuator 40 is mounted within frame 12 with its cylinder 41 provided with an anchoring eye 42 which is pivotally connected with a support bracket 43 secured at one of the lower corners of frame 12. Actuator 40 has a piston rod 44 provided with a bearing 45 which is pivotally connected with a journal block 46 secured on the underside of guide member 21 of the digging arm. Cylinder 41 has fluid couplings 47 and 48 to which are secured suitable conduits for the admission of hydraulic fluid to effect operation of actuator 40.

As in the case of actuator 30, actuator 40 is of the double acting type wherein hydraulic fluid is introduced into one end of the actuator while fluid exits from the other to effect elongation or retraction of the actuator. A suitable control valve (not shown) is interposed in the fluid lines leading to actuator 40 from the hydraulic fluid pressure source with such valve being appropriately positioned on the tractor 10 adjacent the operator's seat S. Accordingly, by manipulation of such valve, the operation of actuator 40 may be controlled to swing the digging arm 20 about pin 22 to effect lifting of the tree which is to be transplanted.

Having specifically described the structure of the particular embodiment illustrated on the drawings, reference will now be had to the mode of operation of the plant digging machine. In connection with the description of the machine operation, attention is directed to the showing of Figure 1 on the drawings.

It is contemplated that in normal operation and use of the digging machine of the instant invention, such machine will be used in plant removal after an undercutting plow has been run down the row of plants which are to be removed so as to make a generally U-shaped cut beneath the plants to be transplanted. This type of plow has been used for many years in the nursery industry and is effective to make a cut of about 24 to 32 inches across at the surface of the earth and around 18 inches deep. On Figure 1 the generally U-shaped cut is illustrated by the line C.

The under plowing operation is preferably performed prior to utilization of the digging machine of the instant invention because it has been found that by taking this initial step the removal of the trees by the digging machine is expedited resulting in less dirt being left clinging to the tree roots. However, it is possible that with certain shallow rooted trees the digging machine of this invention may be employed without previously performing the undercutting step. In any event the undercutting plow may be employed to cut the roots beneath the trees to be transplanted several months prior to the time at which the trees are to be actually dug. This is to say that in a period of several months following the undercut plowing operation the roots of the trees will not grow to such an extent as to overcome the effect of the under plowing operation and thereby make the tree digging unduly difficult.

When the digging machine is employed in removing a tree, shrub, etc. for transplanting, the tractor 10 is driven down along the row until the digging fork 24 is positioned directly opposite the side of the tree T to be dug. At this time the fork will be positioned as shown in solid lines on Figure 1. The operator will thereupon halt movement of the tractor and operate the appropriate hydraulic fluid control valve to cause elongation of actuator 20 and thereby extend digging fork 24 downwardly into the earth at the base of the tree to be dug. The fork 24 will move into the earth at an angle such as to extend generally into the middle of the root network of the particular tree being dug. Once the fork has been so positioned by extension of actuator 30, actuator 40 is operated by appropriate manipulation of its control valve to swing the digging arm 20 about pin 22 and thereby move digging fork 24 in an arcuate path to lift the tree T which is being dug.

Once the tree has been lifted, it is a simple matter for other workmen in the tree digging crew to grasp the tree trrunk and lift it off of fork 24 and onto a transporting truck or wagon for removal from the row. It has been found that with the fork 24 entering approximately at the middle of the root system combined with the arcuate swinging action of the fork in lifting the tree, a minimum amount of dirt clings to the tree roots. The quantity of earth remaining on the roots may be further reduced by jiggling the digging arm 20 by means of actuator 40 so as to shake off a substantial quantity of the earth surrounding the tree roots.

After a tree has been dug by performing the hereinabove set forth steps, the machine operator will retract the digging fork 24 and swing arm 20 back to its position in readiness for the next tree digging operation. Then the operator will move tractor 10 to position the digging fork 24 opposite the side of the next tree to be removed for transplanting.

There are particular advantages in the relation of the digging apparatus of this invention to the carrying vehicle so that the overall digging machine has certain features which make it superior to prior known plant digging apparatuses. By reason of the fact that the digging fork 24 operates laterally or from one side of the carrying vehicle, it is possible for the vehicle to be propelled along the side of the row of trees in a direction generally parallel to the row. The carrying vehicle or tractor does not have to be aimed at the particular plant to be dug but is merely moved alongside of the tree to perform the digging operation. This characteristic permits the tree rows to be planted with a minimum spacing between rows since there is no necessity to provide space to jockey the tractor into position for the digging operation.

Also, it is possible by use of the tree digging machine of this invention to remove for transplanting only selected ones of the trees in a particular row. This is especially important in nursery operation since many times it occurs that certain treeth in a particular row are too small or otherwise undesirable for transplanting at a specific time. Accordingly, with the instant invention those trees which are not to be removed may be skipped and the carrying vehicle driven on down the row and stopped for the tree removing operation at only those trees which are to be transplanted.

Merely by way of example it may be pointed out that the digging fork 24, which is shown with three prongs, in its actual size would be about 18 inches in width. However, the fork is removably secured to the end of side element 23 by means of bolt 25 and accordingly different size and/or design forks may be attached to the end of slide element 23 as desired. Thus, it is possible to utilize different digging forks depending upon the size of plants to be dug and upon whether such plants have generally coarse roots or a fibrous root system.

It is generally considered important in connection with the instant invention that the digging fork be inserted into the earth at the base of the tree to be transplanted at an angle such that the end of the fork when fully inserted is disposed adjacent the middle of the root system within the cut formed by the undercutting plow. Thus, for example, when the digging arm 20 is extended into the earth for plant removal it will normally be disposed at an angle of from 45° to 60° relative to the surface of the earth surrounding the tree. With the fork 24 inserted into the ground within this range, it has been found that the tree roots are freed from the soil without requiring undue power in swinging the digging arm and at the same time without damaging the critical roots of the tree needed for satisfactory growth after transplanting.

Having thus described my invention, what I claim is:

1. A machine for digging trees comprising a vehicle having means for propelling it in a path generally parallel to a row of trees to be transplanted, a frame mounted on said vehicle and having a pocket opening in a direction transversely to the normal direction of movement of said vehicle, an axially elongatable arm received within said pocket and extending laterally outwardly and downwardly relative to said vehicle, said arm having the inner end thereof connected to said frame to pivot about a fixed axis on said frame, a digging fork carried at the outer end of said arm, means for moving said fork outwardly to insert said fork into the earth at the base of a tree to be dug, and means for pivoting said arm about said pivotal connection to swing said fork in an arc for lifting the tree being removed from the ground.

2. A machine for digging trees to be transplanted as recited in claim 1 wherein said arm includes a guide member with the end thereof pivotally connected to said frame, and a slide element telescopically received within said guide member with said digging fork detachably secured to the outer end of said slide element.

3. A machine for digging trees to be transplanted as recited in claim 1, wherein said means for moving said fork and said means for pivoting said arm each comprises an extensible actuator.

4. A machine for digging trees to be transplanted as recited in claim 1 wherein said frame is mounted across the rear of said vehicle and includes upright parallel members providing the lateral opening into said pocket with said arm being slidably received between said parallel members whereby said upright parallel members guide swinging movement of said arm in a substantially vertical plane.

5. An apparatus for digging trees to be transplanted comprising a supporting frame having a pocket opening laterally of said frame, means for mounting said frame on a carrying vehicle with said pocket opening in a direction transversely to the normal direction of movement of the vehicle, an axially elongatable arm having one end thereof connected to said frame within said pocket to pivot about a fixed axis on said frame and a digging fork extending outwardly and downwardly relative to said pocket at the other end of said arm, means for axially extending said arm to move said fork into the earth at the base of a tree to be dug, and means for swinging said arm about its pivotally connected end to move said fork in an arc for lifting the tree while such fork remains inserted into the earth at the base of the tree.

6. An apparatus for digging trees to be transplanted comprising a supporting frame, a guide member having one end connected to said frame to pivot about a fixed axis on said frame, a slide element cooperating with said guide member to be axially extensible from the other end of said guide member, means for moving said slide element axially relative to said guide member, a digging fork mounted on the outer end of said slide element to be driven into the earth at the base of a tree to be dug, means for pivoting said guide member and the slide element cooperating therewith about its pivotal mounting whereby said digging fork will be swung in an arcuate path to lift the tree being dug, and means for mounting said frame transversely to the normal direction of movement of the carrying vehicle with the digging fork extending laterally outwardly and downwardly of one side of the vehicle.

7. An apparatus for digging trees to be transplanted as recited in claim 6 wherein said means for moving said slide element comprises an extensible actuator connected between said guide member and said slide element, and said means for pivoting said guide member comprises an extensible actuator pivotally connected between said frame and a point intermediate the ends of said guide member.

8. An apparatus for digging trees to be transplanted as recited in claim 7 wherein said frame has a pair of upright parallel members disposed on opposite sides of said guide member to restrain lateral movement of said guide member in a substantially vertical plane when it swings about its pivotal mounting in performing a tree digging operation.

References Cited in the file of this patent

UNITED STATES PATENTS

| 21,206 | Maffet | Aug. 17, 1858 |
| 984,412 | Andrews | Feb. 14, 1911 |
| 2,474,037 | Cuthrell | June 21, 1949 |
| 2,652,639 | Kluckhohn | Sept. 22, 1953 |
| 2,681,518 | Troop | June 22, 1954 |